(12) United States Patent
Pantfoerder

(10) Patent No.: US 9,443,460 B2
(45) Date of Patent: *Sep. 13, 2016

(54) LUMINESCENCE SHOCK AVOIDANCE IN DISPLAY DEVICES

(71) Applicant: Apple Inc., Cupertino, CA (US)

(72) Inventor: Kai Achim Pantfoerder, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,627

(22) Filed: Jul. 7, 2015

(65) Prior Publication Data

US 2015/0310795 A1 Oct. 29, 2015

Related U.S. Application Data

(63) Continuation of application No. 14/279,746, filed on May 16, 2014, now Pat. No. 9,082,336, which is a continuation of application No. 13/777,072, filed on Feb. 26, 2013, now Pat. No. 8,743,161, which is a (Continued)

(51) Int. Cl.
*G09G 3/20* (2006.01)
*G09G 5/10* (2006.01)
*G06F 3/041* (2006.01)

(52) U.S. Cl.
CPC ........... *G09G 3/2003* (2013.01); *G06F 3/0416* (2013.01); *G09G 3/20* (2013.01); *G09G 5/10* (2013.01); *G09G 2320/0606* (2013.01); *G09G 2320/0626* (2013.01); *G09G 2320/0633* (2013.01); *G09G 2320/0653* (2013.01); *G09G 2360/144* (2013.01)

(58) Field of Classification Search
CPC ........... G09G 5/02; G09G 2320/0666; G09G 2320/0626; G09G 2320/0233; G09G 2360/144; H04N 1/60
See application file for complete search history.

(56) References Cited

U.S. PATENT DOCUMENTS

| | | |
|---|---|---|
| 4,516,055 A | 5/1985 | Nelson |
| 5,483,261 A | 1/1996 | Yasutake |
| 5,488,204 A | 1/1996 | Mead et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Final Office Action mailed Aug. 2, 2010, for U.S. Appl. No. 11/800,293, filed May 4, 2007, 17 pages.

(Continued)

*Primary Examiner* — Antonio A Caschera
(74) *Attorney, Agent, or Firm* — Zachary D. Hadd

(57) ABSTRACT

A luminescence shock avoidance algorithm selectively limits the brightness level of a display device when the display device is activated in a dark environment to prevent the temporary vision impairment that can occur when a display device is activated in a dark environment. The algorithm receives the state of the display (e.g. on or in standby mode), and can optionally receive an ambient lighting value from an ambient light sensor and a user-selectable manual brightness adjustment setting to determine whether luminescence shock avoidance should even be triggered, and if it is triggered, how much should the brightness level of the display be limited.

20 Claims, 7 Drawing Sheets

Related U.S. Application Data continuation of application No. 13/304,176, filed on Nov. 23, 2011, now Pat. No. 8,405,688, which is a continuation of application No. 11/800,293, filed on May 4, 2007, now Pat. No. 8,068,125.

(60) Provisional application No. 60/878,755, filed on Jan. 5, 2007.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,094,185 A | 7/2000 | Shirriff | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,529,212 B2 | 3/2003 | Miller et al. | |
| 6,690,387 B2 | 2/2004 | Zimmerman et al. | |
| 6,713,745 B2 | 3/2004 | Lin et al. | |
| 6,762,741 B2 | 7/2004 | Weindorf | |
| 6,865,405 B2 | 3/2005 | Lin | |
| 7,015,894 B2 | 3/2006 | Morohoshi | |
| 7,095,392 B2 | 8/2006 | Lin | |
| 7,184,064 B2 | 2/2007 | Zimmerman et al. | |
| 7,221,374 B2 * | 5/2007 | Dixon | G09G 3/3413 345/589 |
| 7,605,829 B2 | 10/2009 | Oh | |
| 7,663,607 B2 | 2/2010 | Hotelling et al. | |
| 7,701,434 B2 | 4/2010 | Kreek et al. | |
| 8,068,125 B2 | 11/2011 | Pantfoerder | |
| 8,405,688 B2 | 3/2013 | Pantfoerder | |
| 9,082,336 B2 * | 7/2015 | Pantfoerder | G09G 3/20 |
| 2005/0117062 A1 | 6/2005 | Chien et al. | |
| 2006/0026521 A1 | 2/2006 | Hotelling et al. | |
| 2006/0197753 A1 | 9/2006 | Hotelling | |
| 2007/0040774 A1 | 2/2007 | Lee et al. | |
| 2007/0222730 A1 | 9/2007 | Kao et al. | |
| 2008/0158172 A1 | 7/2008 | Hotelling et al. | |
| 2008/0165203 A1 | 7/2008 | Pantfoerder | |

OTHER PUBLICATIONS

Final Office Action mailed Apr. 6, 2011, for U.S. Appl. No. 11/800,293, filed May 4, 2007, 17 pages.

Lee, S.K. et al. (Apr. 1985). "A Multi-Touch Three Dimensional Touch-Sensitive Tablet," Proceedings of CHI: ACM Conference on Human Factors in Computing Systems, pp. 21-25.

Non-Final Office Action mailed Feb. 16, 2010, for U.S. Appl. No. 11/800,293, filed May 4, 2007, 14 pages.

Non-Final Office Action mailed Dec. 3, 2010, for U.S. Appl. No. 11/800,293, filed May 4, 2007, 15 pages.

Notice of Allowance mailed Aug. 10, 2011, for U.S. Appl. No. 11/800,293, filed May 4, 2007, 9 pages.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

LUMINESCENCE SHOCK AVOIDANCE IN DISPLAY DEVICES

This application is a continuation of U.S. patent application Ser. No. 14/279,746, filed May 16, 2014, which is a continuation of U.S. patent application Ser. No. 13/777,072, filed Feb. 26, 2013, now U.S. Pat. No. 8,743,161, issued Jun. 3, 2014, which is a continuation of U.S. patent application Ser. No. 13/304,176, filed Nov. 23, 2011, now U.S. Pat. No. 8,405,688, issued Mar. 26, 2013, which is a continuation of U.S. patent application Ser. No. 11/800,293, filed May 4, 2007, now U.S. Pat. No. 8,068,125, issued Nov. 29, 2011, which claims priority to U.S. provisional patent application No. 60/878,755, filed on Jan. 5, 2007, each of which is hereby incorporated by reference herein in its entirety.

FIELD OF THE INVENTION

This invention relates to display devices, and more particularly, to avoiding luminescence shock (temporary vision impairment) when a display device is activated in a dark environment.

BACKGROUND

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface. The touch sensor panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Because touch screens can reduce or eliminate the need for physical keypads or buttons, the touch screens themselves can often be made larger in comparison to the overall size of the device. These larger touch screens have enabled even small devices such as personal digital assistants (PDAs), mobile telephones, digital audio/video players, and the like to provide a wider variety of content than previously possible, including video, graphics, Internet access, photos, and the like. The convenience of today's handheld portable devices combined with their ever-increasing multi-media functionality has made such devices seemingly ubiquitous, with users carrying them everywhere, in purses or clipped to belts. To a dedicated user, these personal devices can be as indispensable as a wallet. To that end, users may place these personal devices within arms reach wherever they go, including vehicles, movie theaters, and the like.

Because personal devices tend to have small batteries, power savings is critical. A large display illuminated to full brightness will exhaust a battery in no time, and thus power saving functions such as sleep modes are common in personal devices. For example, the display of a mobile telephone may be dimmed or go dark altogether until a call is received, or the screen of a PDA may go blank until the user activates a function or a communication such as an e-mail or text message is received. However, if one of these personal devices is in a sleep mode in a dark environment and the display is suddenly illuminated due to a received call or other communication, a nearby user who happens to be looking at the device or is instinctively drawn to looking at the display when it illuminates can suffer temporary vision impairment. Because the user's pupils have opened up in the dark environment, the sudden flash of light can cause short-term blindness or at least impaired vision. This temporary impaired vision can range from a mere annoyance to a life-threatening situation if the user is driving a motor vehicle.

SUMMARY

A luminescence shock avoidance algorithm can be employed to selectively limit the brightness level of a display device when the display device is activated in a dark environment to prevent the temporary vision impairment that can occur when a display device is activated in a dark environment. The algorithm receives the state of the display (e.g. on or in standby mode), and can optionally receive an ambient lighting value from an ambient light sensor and a user-selectable manual brightness adjustment setting to determine whether luminescence shock avoidance should even be triggered, and if it is triggered, how much should the brightness level of the display be limited.

When a display device is in a standby, sleep or powered-down mode to save battery power, the display is at a zero brightness level. When the display is automatically activated, such as when a telephone call is received, the display can turn on to a brightness level determined by the ambient light level detected by the ambient light sensor. If the device is in a car being driven at night, for example, then when a call or other triggering activity is detected, the display brightness level may instantly jump from zero to some predetermined level. Because the user's eyes are likely to be already adjusted to the darkness of the car, the sudden change in display brightness level from can cause luminescence shock and temporary vision impairment, which can be dangerous to the operator of the car, especially if the driver takes a glance at the newly illuminated display.

To avoid luminescence shock, if the display device is off and a call or other triggering activity is detected, the ambient light sensor will turn on and detect a certain ambient light level. In one embodiment, if the detected ambient light level is greater than or equal to a threshold value, then the display device will turn on at a brightness level according to the current display brightness setting. In other words, if the ambient light level is greater than or equal to threshold value, the display will turn on from a zero brightness level to the level defined by the appropriate brightness function as determined by the current display brightness setting. Because the threshold value is chosen such that no luminescence shock is expected for ambient light levels above the threshold value, no adjustment is made to the display brightness level when the display turns on.

However, if the detected ambient light level is below the threshold value, luminescence shock may occur, so the display device will turn on from a zero brightness level to an initially reduced brightness level as compared to what would normally be expected if the brightness function appropriate for the current display brightness level was followed. In other words, the display will initially turn on to a brightness level less than the appropriate brightness function as determined by the current display brightness setting. This dimmer than usual brightness level is intended to avoid luminescence shock. After some short time period has passed, giving the user's eyes time to adjust, the brightness level can be gradually or instantly increased to the level determined by the appropriate brightness function, which should be closer to ideal for sufficient visibility at the current ambient light level.

In other embodiments, a threshold is not used, and therefore regardless of the detected ambient light level, the display will initially turn on to a brightness level less than the appropriate brightness function as determined by the current display brightness setting. Optionally, as above, after some short time period has passed, the brightness level can be gradually or instantly increased to the level determined by the appropriate brightness function.

If the display device is already on and a call or other triggering activity is detected, there will be no change to the display brightness, regardless of the current light level. In other words, the luminescence shock avoidance algorithm can be employed only when the display device is initially off.

The reduced brightness value may be implemented in a number of different ways. If the detected ambient light level is below a threshold, the reduced display brightness value may be a fixed value, regardless of the current display brightness settings. After some short time period has passed, the brightness level can be gradually or instantly increased to the level determined by the brightness function appropriate for the current display brightness settings. Alternatively, the reduced display brightness value can be a fixed value that is dependent on the current display brightness settings. In another embodiment, the reduced display brightness value is dependent only on the detected ambient light level, regardless of the current display brightness settings. In still other embodiments, the reduced display brightness value is dependent both on the detected ambient light level and the current display brightness settings.

Even in embodiments without an ambient light sensor, and therefore no detected ambient light level, luminescence shock can be avoided. When a telephone call or other triggering activity is detected, the display may initially come on with a reduced brightness value as compared to normal levels. After some short time period has passed, the brightness level can be gradually or instantly increased to normal levels.

In other embodiments, the wavelength of light from the display can be shifted to further reduce luminescence shock. If ambient light levels below a certain threshold are detected when a telephone call or other activity is detected and the display is turned on, the color of the display can be temporarily gamma-shifted into the red region, either alone or in combination with reduced display brightness levels as described above. By gamma-shifting the display towards red light, the brightness of the display will tend to cause the user's pupils to constrict less, so that when the user looks up again at a dark road, for example, the user's vision impairment is reduced. If gamma-shifting is applied in combination with reduced display brightness levels, the display brightness levels may not need to be reduced as much.

DETAILED DESCRIPTION

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

A luminescence shock avoidance algorithm can be employed to selectively limit the brightness level of a display device when the display device is activated in a dark environment to prevent the temporary vision impairment that can occur when a display device is activated in a dark environment. The algorithm receives the state of the display (e.g. on or in standby mode), and can optionally receive an ambient lighting value from an ambient light sensor and a user-selectable manual brightness adjustment setting to determine whether luminescence shock avoidance should even be triggered, and if it is triggered, how much should the brightness level of the display be limited.

Although some embodiments of this invention may be described herein in terms of mobile telephones, it should be understood that other embodiments of this invention may not be so limited, but can be generally applicable to any display device that is capable of automatically waking up from a sleep mode and illuminating the display to a certain level.

Figure 1:
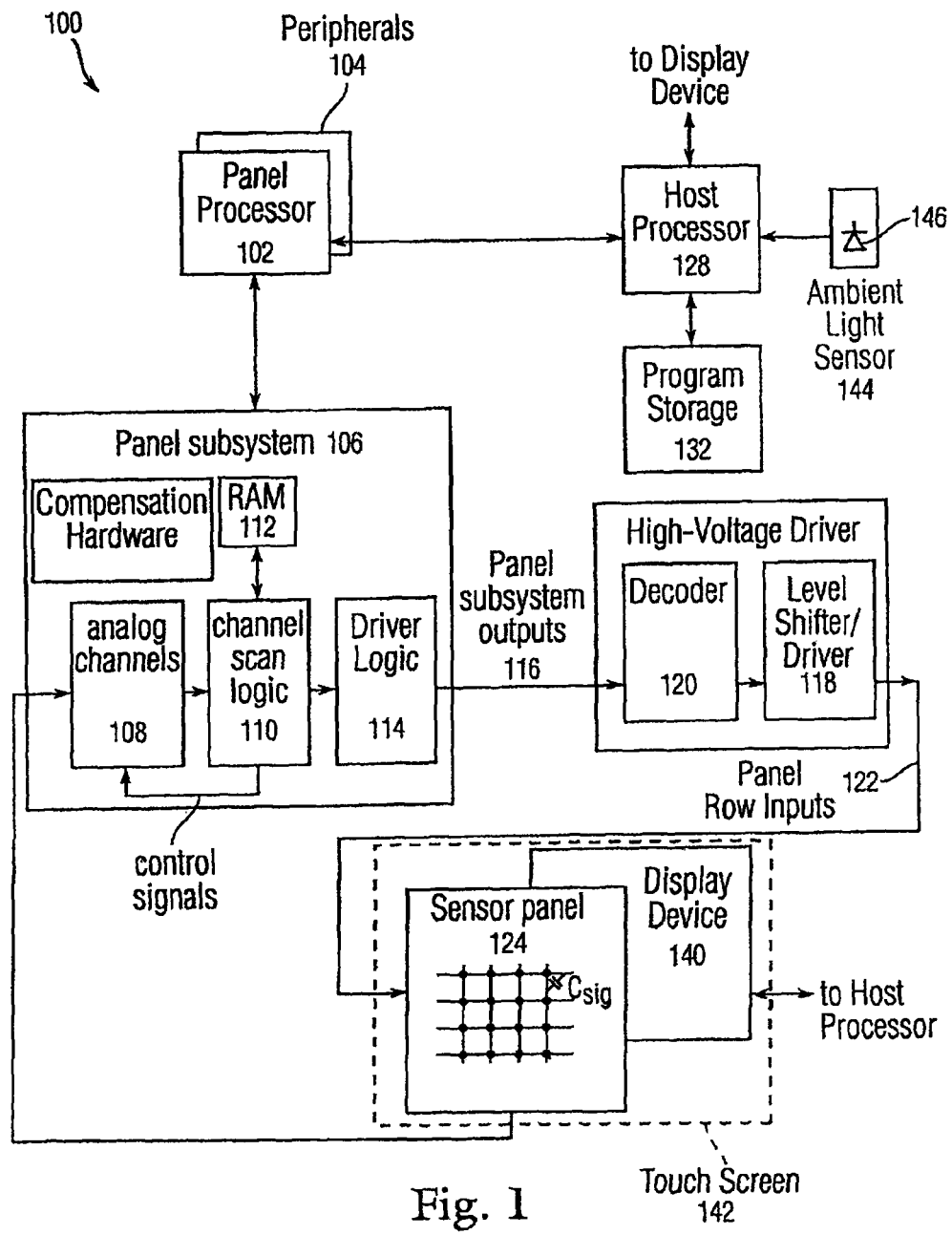
FIG. 1 illustrates an exemplary computing system including a display device operable in accordance with a luminescence shock avoidance algorithm according to one embodiment of this invention.

FIG. 1 illustrates exemplary computing system 100 operable with touch screen 142 formed from sensor panel 124 and display device 140 that may be used in conjunction with embodiments of this invention. However, it should be understood that the system of FIG. 1 is merely illustrative of a number of different touch screen systems that can be used with embodiments of this invention.

Sensor panel 124 can include a capacitive touch sensor panel capable of detecting touch or hovering within the near-field detection capabilities of the capacitive touch sensors, or a proximity sensor panel capable of detecting hovering outside the near field detection capabilities of the capacitive touch sensors, or a combination of both. Examples of a capacitive touch sensor panel and a proximity sensor panel are described in Applicant's co-pending U.S. application Ser. No. 11/649,998 entitled "Proximity and Multi-Touch Sensor Detection and Demodulation," filed on Jan. 3, 2007, the contents of which are incorporated by reference herein.

Sensor panel 124 can be connected to other components in computing system 100 through connectors integrally formed on the sensor panel, or using flex circuits. Computing system 100 can include one or more panel processors 102 and peripherals 104, and panel subsystem 106. The one or more processors 102 can include, for example, ARM968 processors or other processors with similar functionality and capabilities. However, in other embodiments, the panel processor functionality can be implemented instead by dedicated logic such as a state machine. Peripherals 104 can include, but are not limited to, random access memory (RAM) or other types of memory or storage, watchdog timers and the like.

Panel subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of sensor panel 124 to analog channels 108. In addition, channel scan logic 110 can control the driver logic and stimulation signals being selectively applied to rows of sensor panel 124. In some embodiments, panel subsystem 106, panel processor 102 and peripherals 104 can be integrated into a single application specific integrated circuit (ASIC).

Driver logic 114 can provide multiple panel subsystem outputs 116 and can present a proprietary interface that drives high voltage driver 118. High voltage driver 118 can provide level shifting from a low voltage level (e.g. complementary metal oxide semiconductor (CMOS) levels) to a higher voltage level, providing a better signal-to-noise (S/N) ratio for noise reduction purposes. The high voltage driver outputs can be sent to decoder 120, which can selectively connect one or more high voltage driver outputs to one or more panel row inputs 122 through a proprietary interface and enable the use of fewer high voltage driver circuits in the high voltage driver 118. Each panel row input 122 can drive one or more rows in sensor panel 124. In some embodiments, high voltage driver 118 and decoder 120 can be integrated into a single ASIC. However, in other embodiments high voltage driver 118 and decoder 120 can be integrated into driver logic 114, and, in still other embodiments, high voltage driver 118 and decoder 120 can be eliminated entirely.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/ or the like.

Host processor 128 can also perform additional functions that may not be related to panel processing, and can be coupled to program storage 132 and display device 130 such as a liquid crystal display (LCD) for providing a user interface (UI) to a user of the device. For example, a luminescence shock avoidance algorithm according to embodiments of this invention can be implemented in software or firmware and executed by host processor 128 to selectively limit the brightness level of a display device when the display device is activated in a dark environment to prevent the temporary vision impairment that can occur when display device 130 is activated in a dark environment.

In some embodiments of this invention, an ambient light sensor 144 may provide a signal or change in state corresponding to the amount of ambient light present. Ambient light sensor 144 can be a photodiode (e.g. a fast pin diode) 146 or any other device (e.g. a phototransistor or other sensing device) known in the art whose current changes as a function of received ambient light, and can include both an infrared (IR) sensor and a visible light sensor.

Figure 2A:
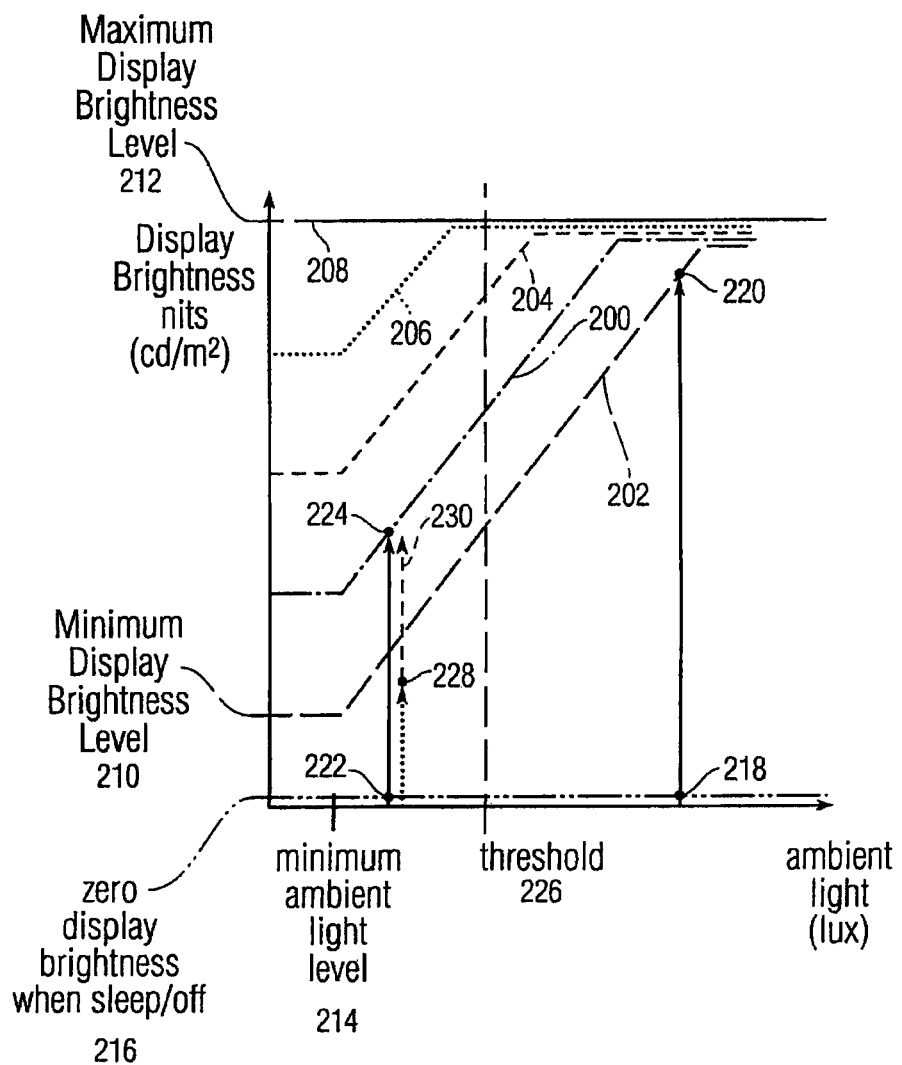
FIG. 2a illustrates exemplary brightness functions of ambient light (in lux (one lumen per square meter)) vs. display device brightness or luminance (in nits (one candela per square meter)) for an exemplary display device according to one embodiment of this invention.

FIG. 2a illustrates exemplary brightness functions of ambient light (in lux (one lumen per square meter)) vs. display device brightness or luminance (in nits (one candela per square meter)) for an exemplary display device according to embodiments of this invention. The brightness functions in FIG. 2a indicate that, for a given ambient light level (the x-axis), the display device will be set to a particular brightness level (the y-axis). FIG. 2a demonstrates that as the ambient light decreases, less light is needed from the display to maintain sufficient visibility, and as the ambient light increases, more light is needed from the display to maintain sufficient visibility. In FIG. 2a, lines 200, 202, 204, 206 and 208 represent a sampling of brightness functions (or various modified brightness functions) of ambient light vs. display device brightness that can be selected by a user using a manual display brightness control setting, although it should be noted that the brightness functions need not be largely linear, but can be non-linear and can even include discrete steps. The brightness functions may be mathematical expressions computed by a processor, or look-up tables stored in memory. In the example of FIG. 2a, line 200 can be the default (neutral) display brightness function, but if the user desires a lower display brightness, the control setting can be adjusted down, either in continuous or discrete steps, until an absolute minimum display brightness function 202 is reached. Note that in the example of FIG. 2a, when function 202 hits a minimum ambient light level 214, it does not drop below a minimum display brightness level 210, and thus the display will always be illuminated to some degree, even in absolute darkness. However, it should be understood that minimum levels 210 and 214 are not required.

Conversely, if the user desires a higher display brightness, the control setting can be adjusted up, either in continuous or discrete steps, passing through brightness functions 204 and 206, until an absolute maximum display brightness function 208 is reached. Note that in the example of FIG. 2a, function 208 is maintained at maximum display brightness level 212. At this setting, there is essentially no longer any sensitivity to ambient light, as the display brightness setting is constant, regardless of the ambient light level. It also be understood that in other embodiments, there may be no manual display brightness control, and only a single brightness function (e.g. default function 200) may be employed.

FIG. 2a also illustrates that when the display device is in a standby, sleep or powered-down mode to save battery power, the display is at a zero brightness level 216. When the display is automatically activated, such as when a telephone call is received, the display will turn on to the brightness level determined by the ambient light level detected by the ambient light sensor. For example, if the device was in a brightly lit room when a call is received, the display brightness level may jump from point 218 to point 220. Because the user's eyes are likely to be already adjusted to the lighting in the room, the sudden change in display brightness level from point 218 to point 220 should not cause any luminescence shock. However, if the device is in a car being driven at night, for example, when a call is received, the display brightness level may jump from point 222 to point 224. Although the display brightness level of point 224 is far less than point 220, nevertheless because the user's eyes are likely to be already adjusted to the darkness of the car, the sudden change in display brightness level from point 222 to point 224 can cause luminescence shock and temporary vision impairment, which can be dangerous to the operator of the car.

To avoid luminescence shock, an algorithm may be applied as follows. If the display device is off and a call or other triggering activity is detected, the ambient light sensor will turn on and detect a certain ambient light level. In one embodiment, if the detected ambient light level is greater than or equal to a luminescence shock threshold value 226, then the display device will turn on at a brightness level according to the current display brightness setting. In other words, if the ambient light level is greater than or equal to threshold value 226, the display will turn on from a zero brightness level to the level defined by the appropriate brightness function as determined by the current display brightness setting (e.g. from point 218 to point 220). Threshold value 226 can be determined empirically and then used as a fixed value in the algorithm, or it can be user programmable. Because threshold value 226 is chosen such that no luminescence shock is expected for ambient light levels above the threshold value, no adjustment is made to the display brightness level when the display turns on.

However, if the detected ambient light level is below threshold value 226, luminescence shock may occur, so the display device will turn on from a zero brightness level to an initially reduced brightness level as compared to what would normally be expected if the brightness function appropriate for the current display brightness level was followed. In other words, the display will initially turn on to a brightness level less than the appropriate brightness function as determined by the current display brightness setting (e.g. from point 222 to point 228, which is less than point 224). This dimmer than usual brightness level is intended to avoid luminescence shock. After some short time period has passed (e.g. five seconds), giving the user's eyes time to adjust, the brightness level can be gradually or instantly increased to the level determined by the appropriate brightness function (see arrow 230), which should be closer to ideal for sufficient visibility at the current ambient light level.

In other embodiments, threshold 226 is not used, and therefore regardless of the detected ambient light level, the display will initially turn on to a brightness level less than the appropriate brightness function as determined by the current display brightness setting. Optionally, as above, after some short time period has passed, the brightness level can be gradually or instantly increased to the level determined by the appropriate brightness function.

If the display device is already on and a call or other triggering activity is detected, there will be no change to the display brightness, regardless of the current light level. In other words, the luminescence shock avoidance algorithm can be employed only when the display device is initially off.

Figure 2B:
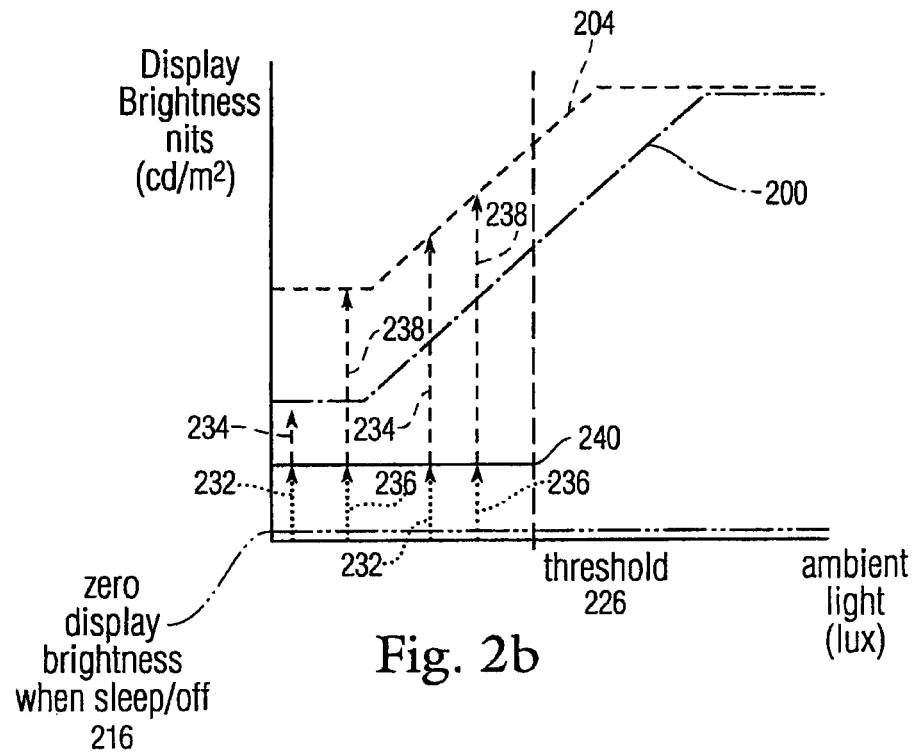
FIG. 2b illustrates a luminescence shock avoidance algorithm wherein if the detected ambient light level is below a threshold, the reduced display brightness value may be a fixed value regardless of the current display brightness settings according to one embodiment of this invention.

The reduced brightness value may be implemented in a number of different ways. FIG. 2b illustrates one embodiment of this invention wherein if the detected ambient light level is below threshold 226, the reduced display brightness value may be a fixed value 240, regardless of the current display brightness settings. After some short time period has passed, the brightness level can be gradually or instantly increased to the level determined by the brightness function appropriate for the current display brightness settings. In the example of FIG. 2b, two brightness functions 200 and 204 are shown representing two different possible current display brightness settings. If the current display brightness settings correspond to brightness function 200, then the display device turns on to a reduced brightness level 240 (see arrows 232), and then after some time has passed, the display device returns to the brightness levels determined by brightness function 200 (see arrows 234). Even if the current display brightness settings correspond to brightness function 204, the display device turns on to the same reduced brightness level 240 (see arrows 236), and then after some time has passed, the display device returns to the brightness levels determined by brightness function 204 (see arrows 238).

Figure 2C:
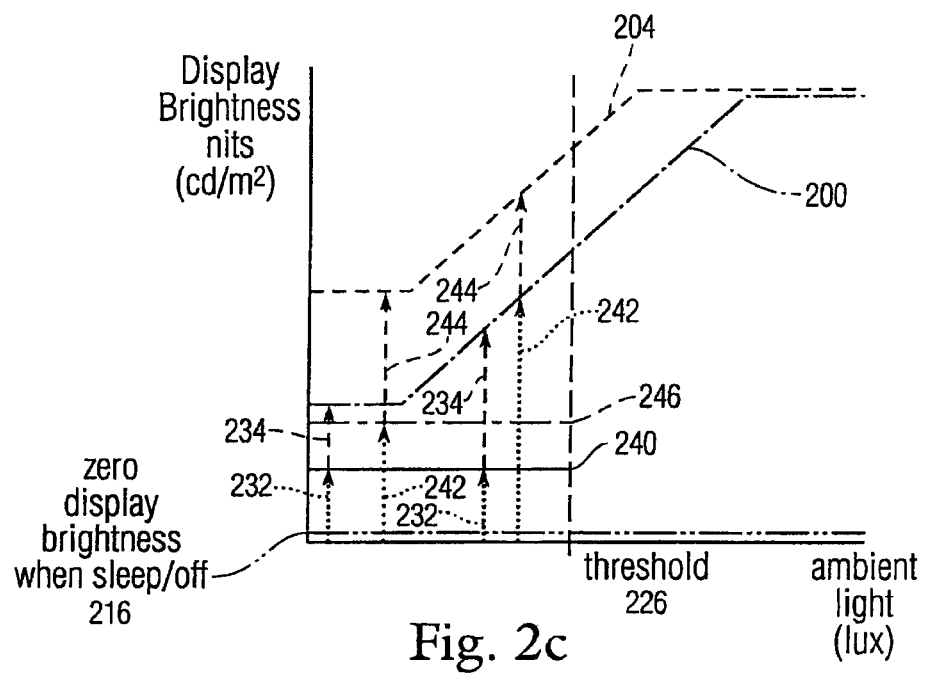
FIG. 2c illustrates a luminescence shock avoidance algorithm wherein if the detected ambient light level is below a threshold, the reduced display brightness value is a fixed value that is dependent on the current display brightness settings according to one embodiment of this invention.

FIG. 2c illustrates one embodiment of this invention wherein if the detected ambient light level is below threshold 226, the reduced display brightness value is a fixed value that is dependent on the current display brightness settings. After some short time period has passed, the brightness level can be gradually or instantly increased to the level determined by the brightness function appropriate for the current display brightness settings. In the example of FIG. 2c, two brightness functions 200 and 204 are shown representing two different possible current display brightness settings. If the current display brightness settings correspond to brightness function 200, then the display device turns on to a reduced brightness level 240 associated with brightness function 200 (see arrows 232), and then after some time has passed, the display device returns to the brightness levels determined by brightness function 200 (see arrows 234). If the current display brightness settings correspond to brightness function 204, the display device turns on to a higher reduced brightness level 246 associated with brightness function 204 (see arrows 242), and then after some time has passed, the display device returns to the brightness levels determined by brightness function 204 (see arrows 244).

As the example embodiment of FIG. 2*c* illustrates, the fixed values 240 and 246 can depend on the current display brightness settings. For example, the higher the current display brightness settings, the higher the fixed value. At the lowest possible current display brightness settings, the fixed value can be the minimum display brightness value 210 (see FIG. 2*a*).

Figure 2D:
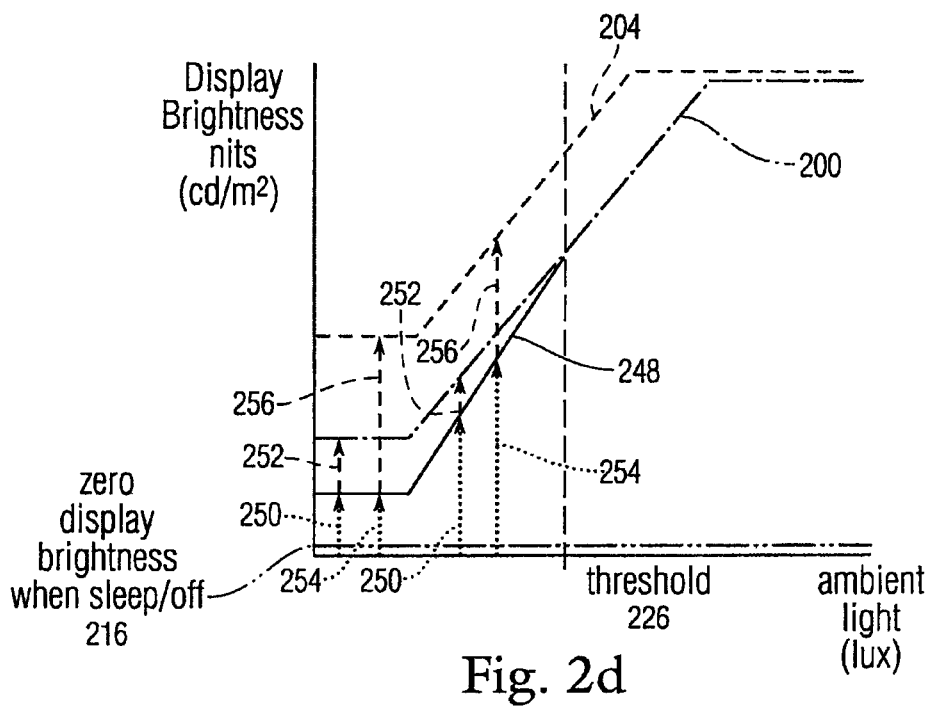
FIG. 2d illustrates a luminescence shock avoidance algorithm wherein if the detected ambient light level is below a threshold, the reduced display brightness value is dependent only on the detected ambient light level, regardless of the current display brightness settings according to one embodiment of this invention.

FIG. 2*d* illustrates one embodiment of this invention wherein if the detected ambient light level is below threshold 226, the reduced display brightness value is dependent only on the detected ambient light level, regardless of the current display brightness settings. After some short time period has passed, the brightness level can be gradually or instantly increased to the level determined by the brightness function appropriate for the current display brightness settings. In the example of FIG. 2*d*, two brightness functions 200 and 204 are shown representing two different possible current display brightness settings. If the current display brightness settings correspond to brightness function 200, then the display device turns on to a reduced brightness level as determined by the detected ambient light level and reduced brightness function 248 (see arrows 250). Note that although reduced brightness function 248 is shown in FIG. 2*d* as a piecewise linear function, any type of function could be used, as long as it represents a reduced brightness level. The reduced brightness function may be a mathematical expression computed by a processor, or may be a look-up table stored in memory. After some time has passed, the display device returns to the brightness levels determined by brightness function 200 (see arrows 252). Even if the current display brightness settings correspond to brightness function 204, the display device turns on to the same reduced brightness level as determined by the detected ambient light level and reduced brightness function 248 (see arrows 254), and then after some time has passed, the display device returns to the brightness levels determined by brightness function 204 (see arrows 256).

Figure 2E:
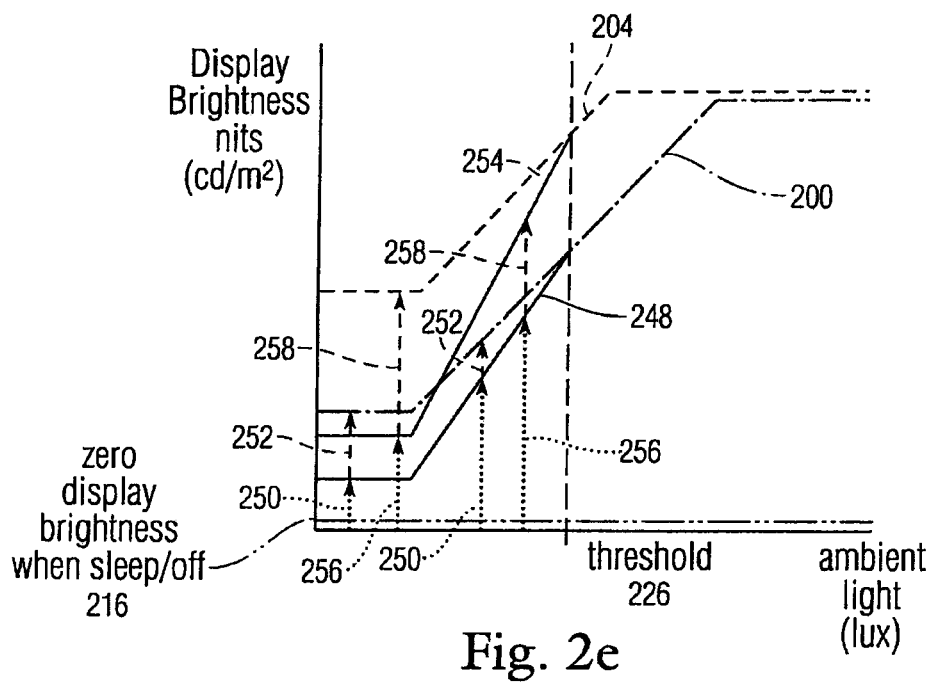
FIG. 2e illustrates a luminescence shock avoidance algorithm wherein if the detected ambient light level is below a threshold, the reduced display brightness value is dependent both on the detected ambient light level and the current display brightness settings according to one embodiment of this invention.

FIG. 2*e* illustrates one embodiment of this invention wherein if the detected ambient light level is below threshold 226, the reduced display brightness value is dependent both on the detected ambient light level and the current display brightness settings. After some short time period has passed, the brightness level can be gradually or instantly increased to the level determined by the brightness function appropriate for the current display brightness settings. In the example of FIG. 2*e*, two brightness functions 200 and 204 are shown representing two different possible current display brightness settings. If the current display brightness settings correspond to brightness function 200, then the display device turns on to a reduced brightness level as determined by the detected ambient light level and reduced brightness function 248 associated with brightness function 200 (see arrows 250). After some time has passed, the display device returns to the brightness levels determined by brightness function 200 (see arrows 252). If the current display brightness settings correspond to brightness function 204, the display device turns on to a reduced brightness level as determined by the detected ambient light level and reduced brightness function 254 associated with brightness function 204 (see arrows 256), and then after some time has passed, the display device returns to the brightness levels determined by brightness function 204 (see arrows 258).

Figure 2F:
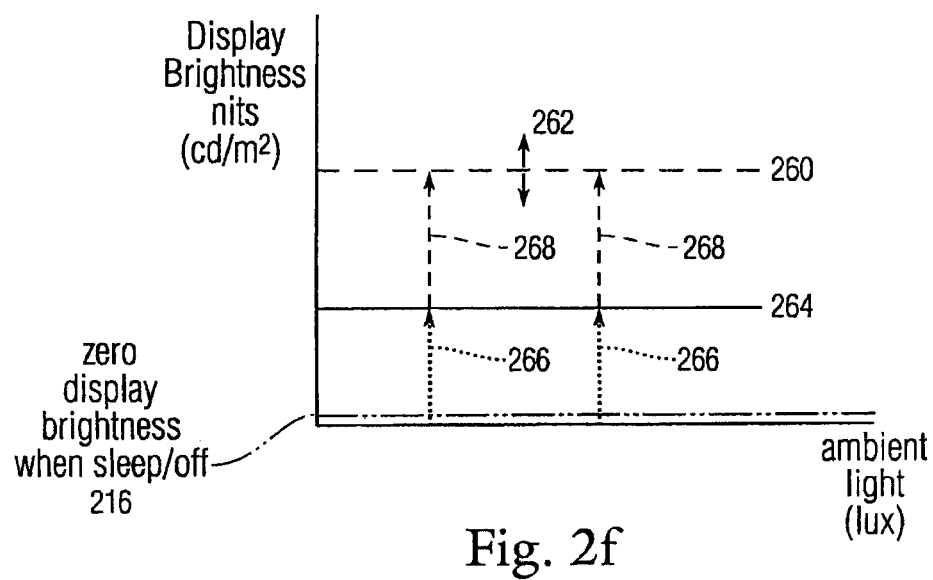
FIG. 2f illustrates a luminescence shock avoidance algorithm in which no ambient light level is detected and the display device initially turns on at a reduced brightness level before ramping up to normal levels according to one embodiment of this invention.

Even in embodiments without an ambient light sensor, and therefore no detected ambient light level, luminescence shock can be avoided. FIG. 2*f* illustrates one embodiment of this invention in which when the display device is on, it remains at a constant level 260, regardless of the ambient light level. In some embodiments, this constant level 260 can be adjusted up or down as indicated by arrows 262 using a manual display brightness control. When a telephone call or other triggering activity is detected, the display may initially come on with a reduced brightness value 264 as compared to line 260 (see arrows 266). After some short time period has passed, the brightness level can be gradually or instantly increased to the level determined by brightness level 260 (see arrows 268).

Figure 3:
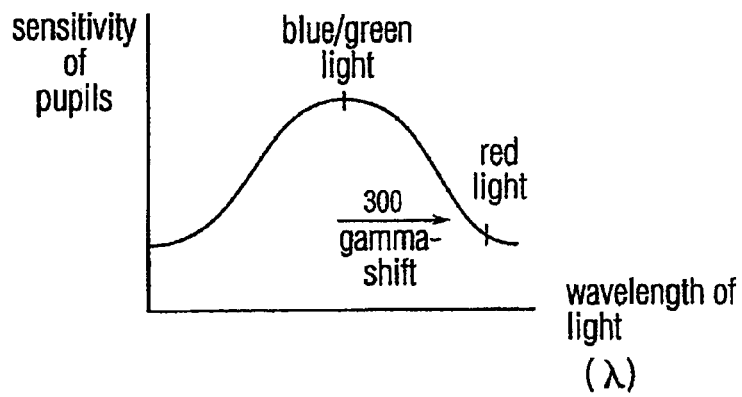
FIG. 3 is a plot of wavelength vs. pupil sensitivity, showing that the pupils are more sensitive to blue/green light as compared to red light to illustrate the purpose of gamma-shifting according to one embodiment of this invention.

In some embodiments of this invention, the wavelength of light from the display can be shifted to further reduce luminescence shock. FIG. 3 is a plot of wavelength vs. pupil sensitivity, showing that the pupils are more sensitive to blue/green light (i.e. the pupils tend to constrict more) as compared to red light. Thus, if ambient light levels below a certain threshold are detected when a telephone call or other activity is detected and the display is turned on, the color of the display can be temporarily gamma-shifted into the red region, either alone or in combination with reduced display brightness levels as described above. By gamma-shifting the display towards red light (see arrow 300), the brightness of the display will tend to cause the user's pupils to constrict less, so that when the user looks up again at a dark road, for example, the user's vision impairment is reduced. If gamma-shifting is applied in combination with reduced display brightness levels, the display brightness levels may not need to be reduced as much.

Figure 4:
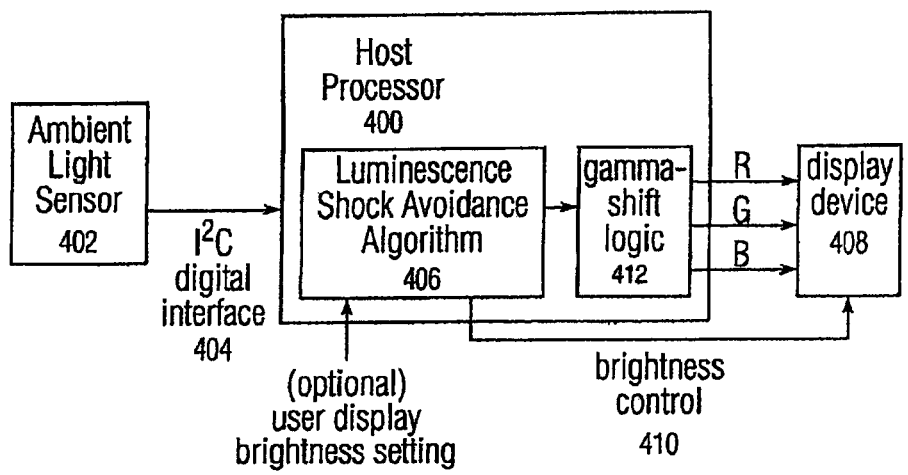
FIG. 4 is a more detailed view of the host processor, ambient light sensor and display device shown in FIG. 1 according to one embodiment of this invention.

FIG. 4 is a more detailed view of the host processor, ambient light sensor and display device shown in FIG. 1. In FIG. 4, host processor 400 receives information on detected ambient light levels from ambient light sensor 402 through an interface which can include and I.sup.2C digital serial interface 404. Host processor 400 can execute luminescence shock software or firmware 406 and control the brightness of display device 408 using control signals 410. In addition, gamma-shift logic 412, which can be a color lookup table, can perform the gamma-shifting described above to alter the RGB inputs to display device 408 and shift the display to the red spectrum as described above.

Figure 5A:
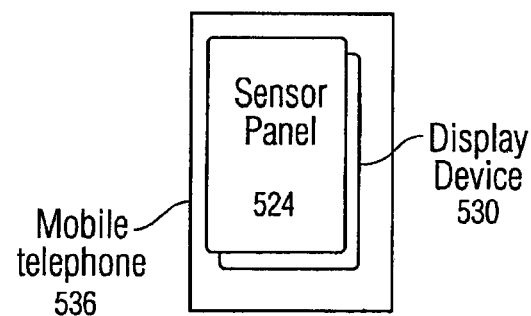
FIG. 5a illustrates an exemplary mobile telephone that can include luminescence shock avoidance algorithms according to one embodiments of this invention.
Figure 5B:
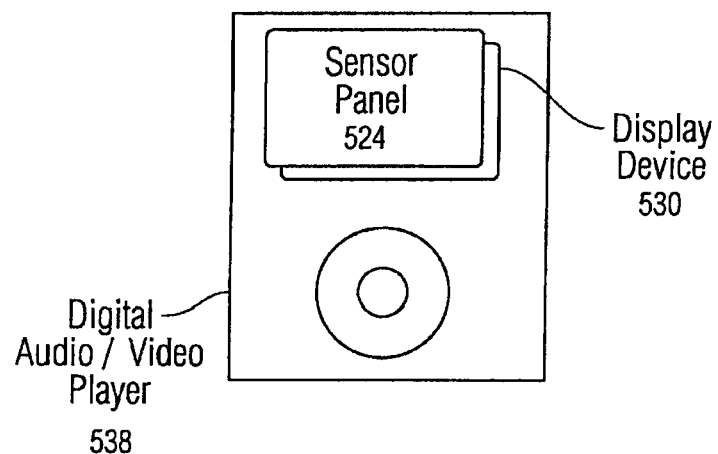
FIG. 5b illustrates an exemplary digital audio player that can include luminescence shock avoidance algorithms according to one embodiments of this invention.

FIG. 5*a* illustrates an exemplary mobile telephone 536 having sensor panel 524 and display device 530 and a processor that can include the luminescence shock avoidance algorithms as described above according to embodiments of this invention. FIG. 5*b* illustrates an exemplary digital audio/video player 538 having sensor panel 524 and display device 530 and a processor that can include luminescence shock avoidance algorithms as described above according to embodiments of this invention. The mobile telephone and digital audio/video player of FIGS. 5*a* and 5*b* can advantageously benefit from the luminescence shock avoidance algorithms because they can limit the amount of temporary vision impairment that can occur when a previously dark display device is illuminated in a dark environment, which can be hazardous in certain situations such as when the user is driving a car at night.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method of operating an electronic device, the method comprising:

with a sensor in the electronic device, detecting an ambient light level;
with processing circuitry in the electronic device, comparing the detected ambient light level to a threshold; and
with the processing circuitry, activating a display in the electronic device, wherein when the detected ambient light level is less than the threshold, activating the display comprises at least temporarily shifting a color of light emitted by the display.

2. The method defined in claim 1, wherein shifting the color of the light emitted by the display comprises adjusting a first wavelength of light emitted by the display towards a second wavelength corresponding to red light.

3. The method defined in claim 2, wherein the first wavelength of light emitted by the display is selected from the group consisting of: green light and blue light.

4. The method defined in claim 1, wherein shifting the color of light emitted by the display comprises adjusting input signals provided to the display using gamma-shift logic in the electronic device.

5. The method defined in claim 1, wherein when the detected ambient light level is equal to or greater than the threshold, activating the display comprises activating the display without shifting the color of light emitted by the display.

6. The method defined in claim 1, further comprising:
with the processing circuitry in the electronic device, determining a first brightness level for the display based on the detected ambient light level.

7. The method defined in claim 6, wherein when the detected ambient light level is less than the threshold, activating the display comprises activating the display at a second brightness level that is less than the first brightness level.

8. The method defined in claim 7, wherein when the detected ambient light level is equal to or greater than the threshold, activating the display comprises activating the display at the first brightness level.

9. An electronic device, comprising:
a display that emits light;
a sensor that detects an ambient light level at the electronic device;
processing circuitry that determines whether the detected ambient light level is less than a threshold; and
gamma-shift logic in the processing circuitry that performs a gamma-shift operation to adjust the light emitted by the display when the processing circuitry determines that the detected ambient light level is less than the threshold.

10. The electronic device defined in claim 9, wherein the gamma-shift logic provides input signals to the display and wherein the gamma-shift operation comprises altering the input signals.

11. The electronic device defined in claim 9, wherein the gamma-shift logic adjusts the light emitted by the display by adjusting a first wavelength of light emitted by the display towards a second wavelength corresponding to red light.

12. The electronic device defined in claim 11, wherein the first wavelength of light emitted by the display is selected from the group consisting of: green light and blue light.

13. The electronic device defined in claim 9, wherein when the detected ambient light level is equal to or greater than the threshold, the gamma-shift logic does not gamma-shift the light emitted by the display.

14. The electronic device defined in claim 9, wherein the processing circuitry determines a first brightness level for the display based on the detected ambient light level.

15. The electronic device defined in claim 14, wherein when the detected ambient light level is less than the threshold, the display emits light at a second brightness level that is less than the first brightness level.

16. The electronic device defined in claim 15, wherein when the detected ambient light level is equal to or greater than the threshold, the display emits light at the first brightness level.

17. A method for operating an electronic device, comprising:
detecting a triggering activity;
in response to detecting the triggering activity, activating an ambient light sensor in the electronic device;
detecting an ambient light level with the ambient light sensor;
comparing the detected ambient light level to a threshold value; and
with processing circuitry in the electronic device, activating a display in the electronic device based on the comparison between the detected ambient light level and the threshold value, wherein activating the display comprises limiting an initial brightness of the display to an initial brightness level that is based on the detected ambient light level.

18. The method defined in claim 17, wherein activating the ambient light sensor comprises turning the ambient light sensor on.

19. The method defined in claim 17, wherein the triggering activity comprises an incoming telephone call.

20. The method defined in claim 17, wherein when the detected ambient light level is less than the threshold value, activating the display comprises gamma-shifting light that is emitted from the display into the red region of the electromagnetic spectrum to avoid luminescence shock.

* * * * *